United States Patent [19]

van der Lely

[11] 4,129,102

[45] Dec. 12, 1978

[54] OPPOSED PISTON ENGINE

[76] Inventor: Cornelis van der Lely, 7, Brüschenrain, Zug, Switzerland

[21] Appl. No.: 660,518

[22] Filed: Feb. 23, 1976

[30] Foreign Application Priority Data

Feb. 21, 1975 [NL] Netherlands ............... 7502062
Feb. 21, 1975 [NL] Netherlands ............... 7502063

[51] Int. Cl.² .................... F02B 25/08; F02B 75/26
[52] U.S. Cl. .................... 123/51 B; 123/58 BC
[58] Field of Search ............. 123/51 R, 51 A, 51 B,
123/58 R, 58 A, 58 B, 58 BC, 53 BA; 91/500, 501

[56] References Cited

U.S. PATENT DOCUMENTS

| | | | |
|---|---|---|---|
| 1,808,664 | 6/1931 | Koschka | 123/58 BC |
| 2,182,213 | 12/1939 | Redrup | 123/58 BC |
| 2,326,912 | 8/1943 | Allison | 123/51 A |
| 2,329,480 | 9/1943 | Neuland | 123/58 BC |
| 2,332,106 | 10/1943 | Neuland | 123/58 BC |
| 2,379,119 | 6/1945 | Tucker | 123/58 BC |
| 2,421,868 | 6/1947 | Bovee | 123/58 BC |
| 2,565,272 | 8/1951 | Sherman | 123/58 BC |
| 2,748,757 | 6/1956 | Morris | 123/53 BA |
| 3,007,462 | 11/1961 | Balzer | 123/58 BC |
| 3,196,698 | 7/1965 | Liddington | 91/501 X |
| 3,212,483 | 10/1965 | Balzer | 123/58 BC |
| 3,333,577 | 8/1967 | Mongitore | 91/501 X |
| 3,536,050 | 10/1970 | Denis | 123/58 BC |

FOREIGN PATENT DOCUMENTS 491,226  2/1930  Fed. Rep. of Germany ............ 91/501

Primary Examiner—Carlton R. Croyle
Assistant Examiner—Michael Koczo, Jr.
Attorney, Agent, or Firm—Mason, Mason & Albright

[57] ABSTRACT

An engine has pairs of opposing pistons that have common combustion spaces located centrally in a housing, around a single central drive shaft. The inner ends of the piston rods are connected to piston heads with ball and socket joints and the outer ends of the rods are similarly connected to swash plate assemblies on each opposite side of the drive shaft relative to the combustion spaces within an engine housing. The cylinder walls have outer ends positioned near the drive shaft and inner ends that are located further from that shaft and adjacent the combustion spaces. Thrust rings of the swash plate assemblies have teeth in mesh with stationary toothed rims within the housing to correctly position the thrust of the pistons. Air is compressed and forced into the combustion spaces with injected fuel from one end of the housing and expelled at the opposite end. An oil pump assembly is mounted at that opposite end of the housing on the drive shaft to supply oil under pressure through ducts in the drive shaft to the various moving parts. Coolant channels are positioned to encircle each side of the combustion spaces at the center of the engine housing. Air being pressured into the combustion spaces are given a whirling motion through slots in the cylinder linings by the configurations of the channels and piston heads.

15 Claims, 8 Drawing Figures

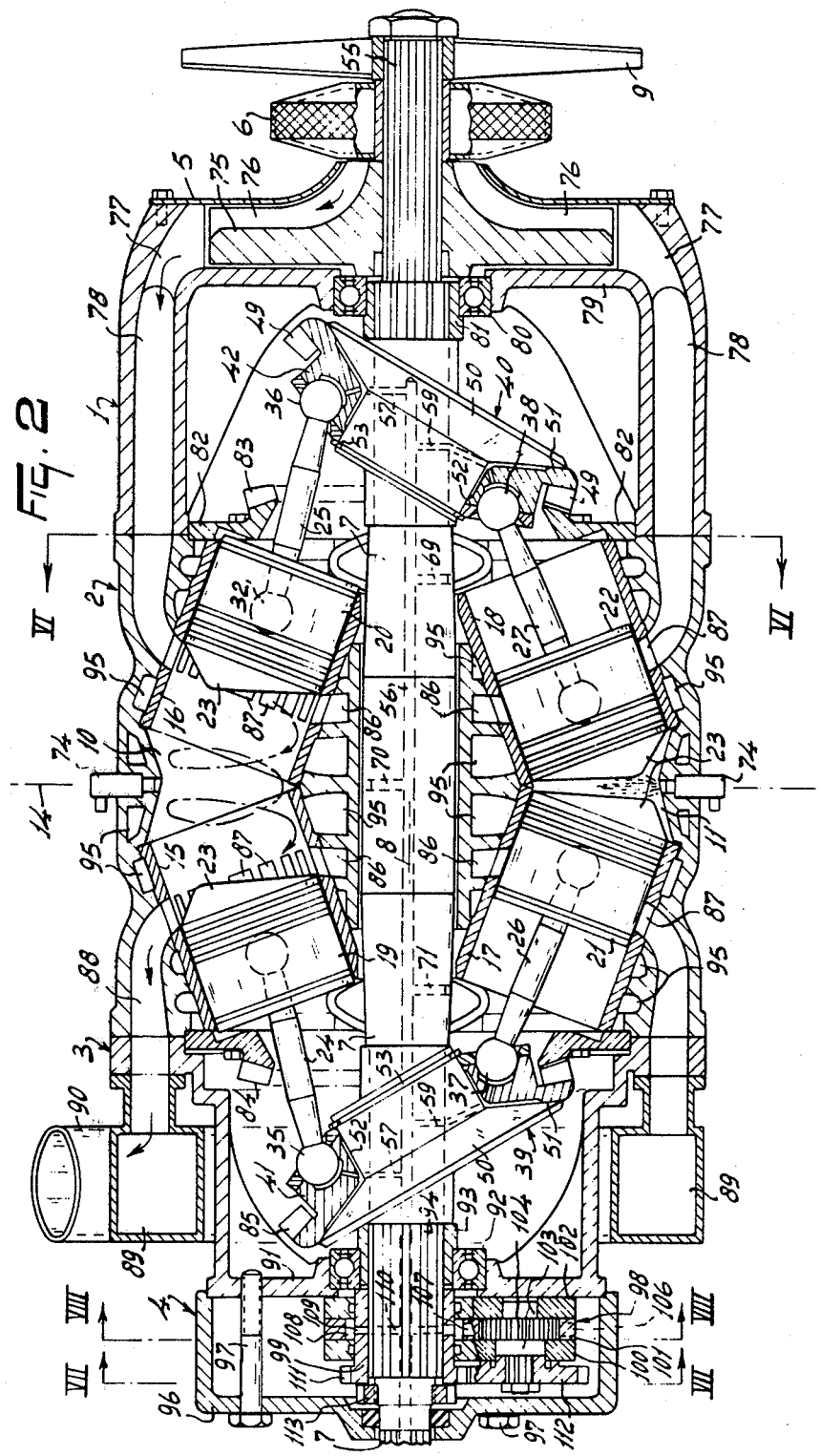

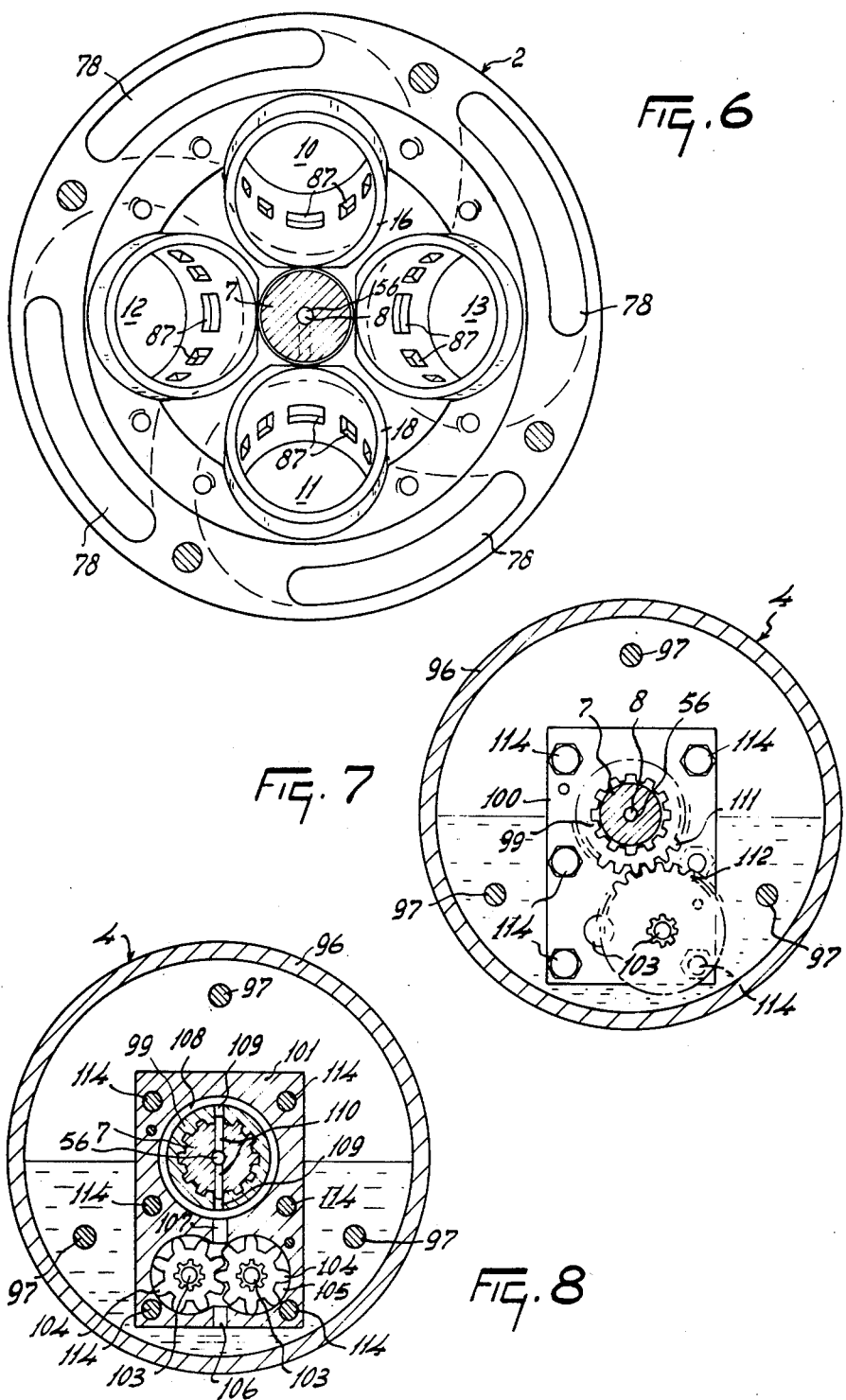

OPPOSED PISTON ENGINE

SUMMARY OF THE INVENTION

The invention relates to an engine or a similar mechanism comprising one or more cylinders with pistons which co-operate with a shaft by means of at least one swash plate drive.

For better understanding of the invention and to show how the same may be carried into effect, reference will be made by way of example to the accompanying drawing.

BRIEF DESCRIPTION OF THE DRAWINGS

FIG. 2 is a section view of the engine in accordance with the invention, showing in addition the center lines of two combustion spaces.

FIG. 6 is an elevation view and partly a section view taken on the lines VI-VI in FIG. 2.

FIG. 7 is a section view taken on the lines VII—VII in FIG. 2.

FIG. 8 is a section view taken on the lines VIII—VIII in FIG. 2.

DESCRIPTION OF THE PREFERRED EMBODIMENT

Figure 1:
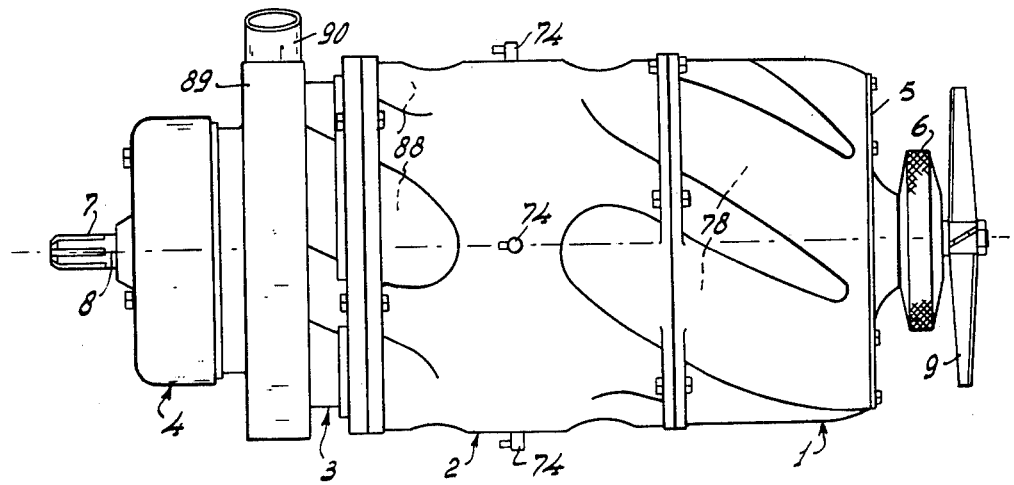
FIG. 1 is a side elevation of the engine in accordance with the invention.

The housing of the engine in accordance with the invention comprises a number of portions interconnected by bolts and flanges, to wit: a housing portion 1 including driving means for the output shaft of the engine, a housing portion 2 accommodating four combustion or compression spaces provided with eight pistons and a housing portion 3 also comprising driving means for the output shaft 7 and a pump housing 4 holding an oil pump and sheets 5 arranged on the side of the housing portion 1 remote from the portion 2, said sheets forming part of the housing of a compressor space, communicating with a centrifugal filter 6 fastened to the output shaft. The circumferences of the parts 1 to 6 are substantially coaxial with a straight driven output shaft 7, which is of one piece and extends over the whole length of the engine and has a center line which is designated by reference numeral 8 (FIG. 1). On the side of the filter 6 remote from the portion 1 the shaft 7 is provided with a fan 9 forming part of a fluid cooling system.

The housing portion 2 has four compression or combustion spaces 10, 11, 12 and 13, each of them being formed by two merging cylindrical spaces, the center lines of which intersect one another at points located in a plane of symmetry 14 at right angles to the center line 8 (FIG. 2), which center lines are coplanar with the center line 8. In other words, the center lines of the cylindrical recesses forming the combustion space 10 and the center lines of the recesses forming the combustion space 11 are located in the same plane with the center line 8 (which is the plane of the drawing in FIG. 2). This plane is at right angles to the plane in which the center lines of the cylindrical recesses forming the combustion spaces 12 and 13 are located, in which plane is also located the center line 8 of the shaft 7. The combustion spaces 10 to 13 are thus arranged in rotation-symmetrical manner around the center line 8 (see also FIG. 6) and these combustion spaces may have identical shapes. The plane 14 (FIG. 2) constitutes a plane of symmetry for the combustion spaces. The two cylindrical recesses forming together the combustion space 10 have wet cylinder linings 15 and 16, which are coaxial with the center lines of the respective cylindrical recesses of the combustion space 10. These center lines, which as stated above intersect one another in the plane 14, are at an angle of 140° to one another opening towards the center line 8. The plane 14 bisects said angle. These center lines together with the center line 8 form an isosceles triangle. This geometrical disposition of the center lines relative to the center line 8 also applies to the combustion spaces 11, 12, and 13 and the center lines of the cylindrical recesses of all combustion spaces are each at an angle of 20° to the center line 8. In a similar manner the cylindrical recesses of the combustion spaces 11 are provided with wet cylinder linings 17 and 18, as well as the cylindrical recesses of the combustion spaces 12 and 13.

Inside cylinder linings 15 and 16, pistons 19 and 20 respectively are axially displaceable; pistons 21 and 22 are similarly displaceable in the cylinder linings 17 and 18 respectively and each of the cylinder linings of the combustion spaces 12 and 13 has pistons which are axially displaceable in a similar manner. Each of said pistons is provided with a piston head 23 facing the plane 14 and projecting out of the cylindrical body of the associated piston, said head being substantially conical and being disposed asymmetrically to the center line of the piston. The tip of said cone is located on the side of the center line of the associated cylinder remote from the shaft 7 and the shape is such that in the position of the pistons in which they are nearest one another, an intermediate space is formed between the piston heads 23 and the boundary wall of the combustion space concerned, said space having three slots at an angle to one another, one of the slots being located between the piston heads, whereas the two further slots are located between the piston heads and the adjacent wall of the combustion space (see the space 11 which generally has the form of an inverted "T" between the piston heads 23 of the pistons 21 and 22 in FIG. 2).

From the sides of the pistons 19 and 22 remote from the piston heads 23, project piston rods 24, 25, 26 and 27, each of them being connected with the aid of a spherical hinge 28 (FIG. 3) with the associated piston so as to be omnidirectionally pivotable. The piston has two intersecting supporting ridges 29, which are integral with the cast piston body (see also FIG. 4). On the side of the supporting ridges 29 remote from the piston head a cavity receives a bearing cushion 30 with intimate fit, said bearing cushion having a hemispherical cavity 31 receiving a sphere 32 provided at one end of the piston rod 25. The spherical hinge is fixed in place with respect to the associated piston by means of a substantially square clamping plate 33 (FIGS. 3 and 4) having at its center an opening fitting around part of the sphere 32 and having the shape of a spherical disc; in the mounted state the plate 33 engages that part of the sphere 32 which is not located in the cavity 31 of the bearing cushion 30 so that the clamping plate 33 prevents the sphere 32 from emerging from the cushion 30 in a direction away from the piston head 23. The clamping plate 33 is fixed with screw bolts 34, which are screwed into the bulk of the supporting ridges 29. This mode of securing a piston and the associated piston rod is described with respect to the piston 20, but the further piston rods are fastened to the respective pistons in an identical manner.

At the end remote from the associated piston each piston rod 24 to 27 is provided with a second sphere 35, 36, 37 and 38 respectively. The same applies to the further four pistons and piston rods not shown in the Figures. The spheres 35 to 38 also form parts of two spherical hinges arranged on in total two swash plate drives 39 and 40 respectively, which co-operate with the shaft 7. The spherical hinges comprising the spheres 35 to 38 comprise two pressing rings 41 and 42 respectively, which essentially form part of the two swash plates 39 and 40 respectively. The relevant construction will be described more fully with respect to the swash plate 40 and the associated pressing ring 42 in FIG. 3. The construction of the swash disc 39 is similar.

Figure 3:
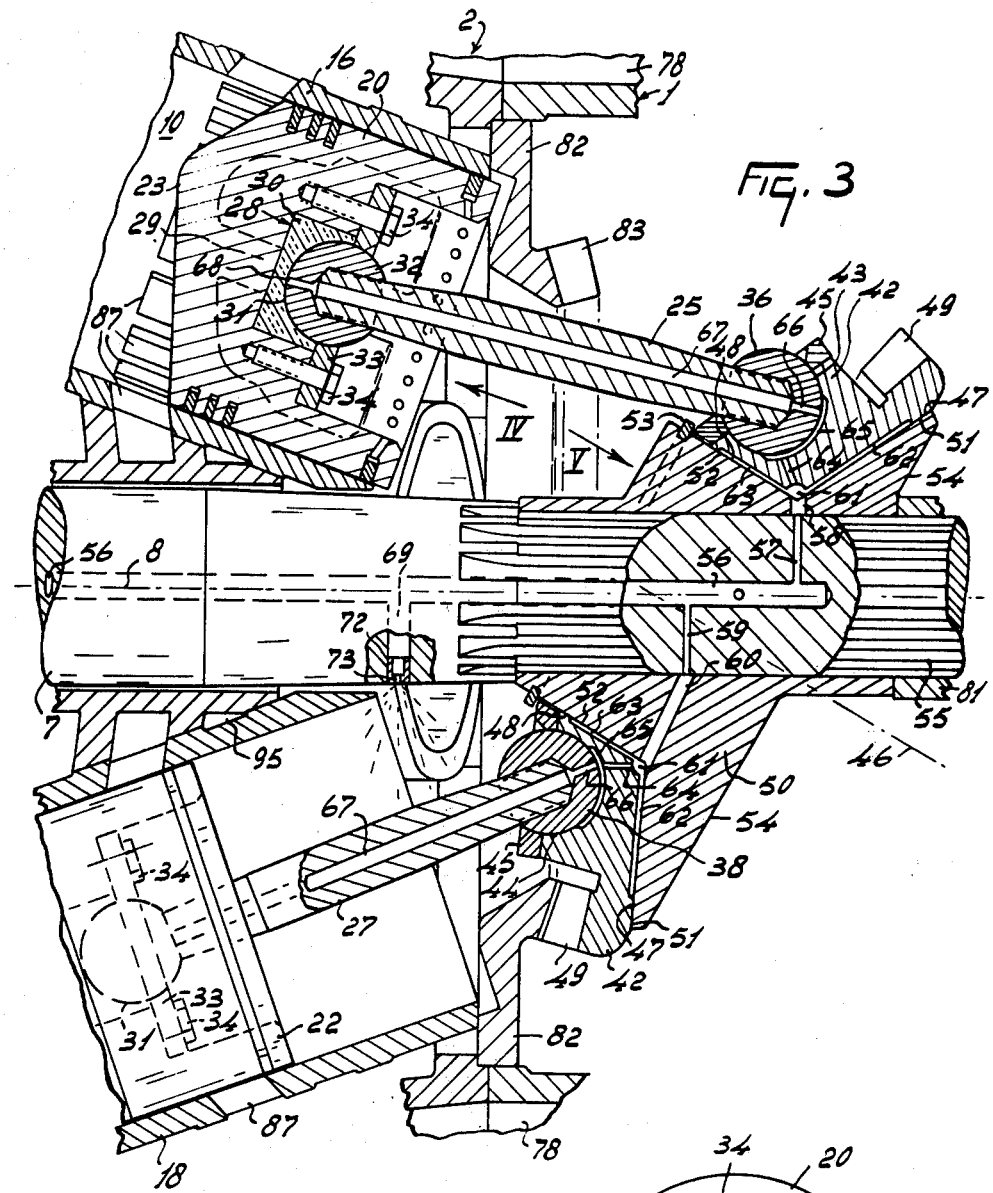
FIG. 3 is part of the section view of FIG. 2 on an enlarged scale.
Figure 4:
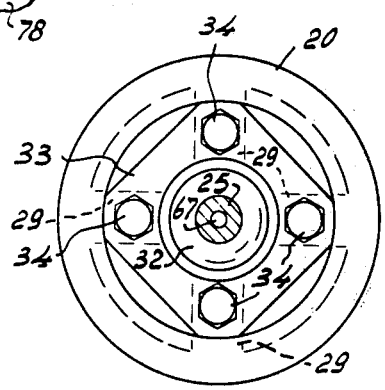
FIG. 4 is an elevation view taken in the direction of the arrow IV in FIG. 3.

One half of each of the spheres 36, 38 (and of the two further spheres not shown in FIG. 3) extends in one of four hemispherical cavities spaced apart by a circumferential angle of 90° in the side of the pressing ring 42 facing the pistons; FIG. 3 shows the cavities 43 and 44 of the spheres 36 and 38 respectively. The spheres 36 and 38 and, of course, also the two further spheres not shown in FIG. 3 are fixed in place with respect to the cavities 43 and 44 respectively of the pressing ring 42 by means of a circular clamping ring 45. The clamping ring 45 is bounded by faces parallel to a conical plane, the axis of which cone is designated in FIG. 3 by the reference numeral 46. A conical boundary face of the pressing ring 42 is designated by reference numeral 47. At the boundary face nearest the center line 46, face 47 changes in a direction towards the associated pistons into a cylindrical surface, which is coaxial with the center line 46 and which is also a boundary surface 48 of the thrust ring 42. The center line 46 is in this embodiment at an angle of 30° to the center line 8 of the shaft 7. On a cross section, the boundary face and surfaces 47 and 48 include an angle of about 120°; and at least one point on the circle wherein 47 and 48 join is in the proximity of the shaft 7.

The boundary surface 48 changes at its end remote from the face 47 into a boundary surface which is approximately parallel to the face 47 and hence also parallel to a conical plane. One half of the sectional area of the thrust ring 42, therefore, has the shape of a parallelogram. The last-mentioned boundary surface is in engagement with one side of the clamping ring 45 and encloses part of the surface of the spheres 36 and 38 not located in the cavities 43 and 44 respectively in the same manner as that in which the clamping plate 33 fixes the sphere 32. The thrust ring 42 has furthermore a conical toothing 49, which is coaxial with the axis 46 and which is wholly located outside the cavities 43 and 44 and the two further cavities, viewed in a direction parallel to the axis 46.

Figure 5:
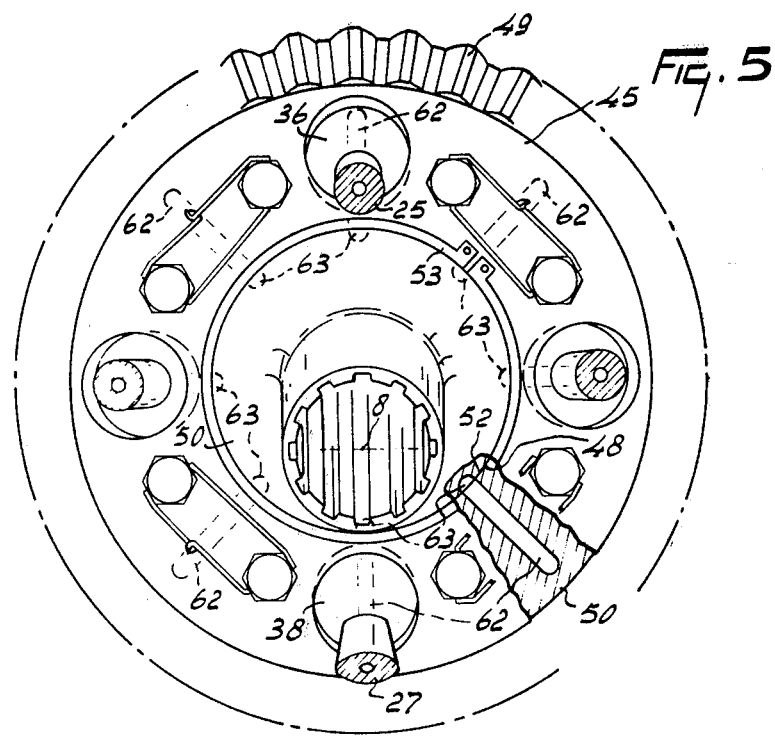
FIG. 5 is an elevation view and partly a section view taken in the direction of the arrow V in FIG. 3.

The thrust ring 42 co-operates with and is freely rotatable with respect to a disc 50, which forms together with the thrust ring 42 the swash plate drive 40. The disc 50 has a boundary surface 51, which engages the major part of the face 47 of the thrust ring 42 and which is parallel to a conical plane, the axis of which is formed by the axis of the cone 46. The boundary face 51 changes on the side of the axis 46 into a cylindrical boundary face 52, which is coaxial with the axis 46 and which engages the major part of the boundary face 48 of the thrust ring 42 (FIGS. 3 and 5). Near one end, the surface 52 of the disc 50 has an outer diameter which coincides substantially, at least at one point of its circumference, with the outer surface of the shaft 7.

Near the end facing the pistons, the cylindrical surface 52 has a cavity receiving a safety ring 53, which prevents the inner edge of the clamping ring 45 from unduly moving parallel to the axis 46, there being, however, between the safety ring 53 and the clamping ring 45 a small amount of play, since in operation the clamping ring 45 turns with respect to the safety ring 53. On the side remote from the safety ring 53 the disc 50 has a boundary face 54, which is at right angles to the axis 46. The disc 50 has a central bore with internal keyways fitting to external keyways 55 on part of the outer circumference of the shaft 7.

The shaft 7 has a bore 56, which is coaxial with the center line 8 and which communicates near an end located at the level of the disc 50 with a radial bore 57 (FIGS. 2 and 3). The bore 57 opens out in a bore 58 also normal to the center line 8 provided in the disc 50, opening out at the outer surface of the disc 50 at a spot located in the interface between the boundary surfaces 51 and 52. Near the bore 57 a radial bore 59 communicates with the central bore 56, the center line of said bore 59 being located in the plane containing the center line 8 and the center line of the radial bore 57, the bore 59 being, however, orientated away from the bore 56 to the other side with respect to the bore 57. The bore 59 opens out in a bore 60 in the disc 50, extending approximately parallel to the boundary face 54 of said disc. The bore 60 also opens out at a spot located in the interface between the boundary faces 51 and 52 of the disc 50, which spot is diametrically opposite the spot where the bore 58 is opening out. The thrust ring 42 has an uninterrupted, circular groove 61 in the interface between the boundary surfaces 47 and 48 of said thrust ring, so that the bores 58 and 60 open out at two spots directly opposite the groove 61. The boundary surface 47 of the thrust ring 42 has eight elongated, straight grooves 62, which extend in a radial direction away from the groove 61, viewed in a direction parallel to the axis 46 (FIGS. 3 and 5). The boundary surface 48 of the thrust ring 42 has eight elongated, straight grooves 63, which extend parallel to the axis 46 away from the uninterrupted groove 61 at spots where the grooves 62 open out in the groove 61. The grooves 62 and 63 terminate, viewed from the uninterrupted groove 61, at a short distance from the outermost boundaries of the faces 47 and 48. At four places of the groove 61 spaced apart by a circumferential angle of 90° the thrust ring 42 has bores 64, which extend away from the groove 61 towards the cavities 43 and 44 and the two further cavities. The cavities 43 and 44 and, or course, also the two further cavities of the thrust ring 42 have each a depression 65 of the surface in the shape of part of a spherical surface (spherical sector). Each of the spheres 36 and 38 and the two further spheres associated with the thrust ring 42 (which spheres have a cavity with internal screwthread for connection with one end of the piston rod 25 and 27 respectively) has a radial bore 66 communicating with a bore 67 through the corresponding piston rod of piston rods 25 and 27 and through the two further piston rods, each bore 66 being coaxial with the center lines of said piston rods. The bores 67 open out at the other end in a radial bore 68 in the sphere 32 (FIG. 3), the bore 68 opening out at the surface of the sphere 32 at the cavity 31 of the bearing cushion 30.

The system of bores in the swash plate 40 described above is provided in a similar manner in the swash plate 39. From the central bore 56 of the shaft 7 a radial bore 69 (FIGS. 2 and 3) extends so that its center line (see the sectional view of FIG. 3) intersects the outer circumference of the shaft 7 at a point located directly at the side of the head face of the lining 18 facing the swash plate 40 so that owing to the inclined disposition of the lining 18 with respect to the shaft 7, the center line extends in the position shown partly inside the cylinder enclosed in the lining 18. Since in operation the shaft 7 is rotating, this also applies to the three adjacent linings.

The linings 16 and 18 and the two linings spaced apart from the former by a circumferential angle of 90° are arranged near the swash plate 40 at such a relative distance that they touch or approximately touch one another and also the shaft 7, whereas the other ends of said linings, that is to say the ends located near the plane of symmetry 14 are spaced apart with respect to the outer circumference of the shaft 7 by a distance which is about 40% of the piston diameter. The distance of the cylinder from the shaft 7 at one end of the cylinder is more than three times the distance of these parts at the other end. This disposition also applies, of course, to the cylinder linings on the other side of the plane 14.

The shaft 7 has furthermore a radial bore 70, the center line of which is located in the plane of symmetry 14. The radial bore 71 of FIG. 2 has the same position and function as the bore 69 on the other side of the plane of symmetry 14. The bores 69 and 71 have each an insert 72 (FIG. 3) which is located near the surface of the shaft 7 and which has a calibrated opening 73.

In the plane of symmetry, the four combustion spaces 10 to 13 have openings leading to the outer side of the engine, in which injectors 74 are arranged so that their center lines are located in the plane 14. These injectors serve to inject fuel. The fuel is subjected by known means (not shown) to pressure and duly injected by known means (not shown).

The end of the shaft 7 located near the swash plate 40 is provided approximately from the interface between the housing portions 1 and 2 throughout its length with external key ways. By means of said key ways, the end of the shaft is provided with the fan 9, which communicates with the filter 6 also arranged on said key ways. The centrifugal filters having a hollow element engages on its side remote from the fan 9 a flywheel 75 secured by means of the key ways 55 and forming part of a compressor for compressing combustion air. The compressor space is closed on the side of the filter 6 by the sheets 5, which form a boundary for a space 76, in which the air sucked in by the blade wheel 75 is compressed and through which space the suction air flows in a direction towards a plurality of guide blades 77 arranged fixedly along the circumfernce of the housing portion 1 at a plane where the compressed air moving in the compressor in a substantially radial direction is bent turned a direction having an axial component. After the fixed blades 77 have suppressed the tangential component of the compressed air, the air is guided by these stationary blades into four air channels 78 defined by the outer wall of the housing portion 1, which are located around the shaft 7 and also around the swash plate drive 40. The channels 78 for the scrubbing air and the combustion air of the combustion space have a shape which may be termed helical with respect to the substantially cylindrical shape of the housing portions 1, 2, and 3. The channels 78 have an outer surface which projects to some extent out of the further part of the surface of the housing portions 1, 2, and 3 (see FIG. 1). The channels 78 have an inner wall which terminates near the blade wheel 75 in a partition 79 at right angles to the shaft 7. This partition has an opening coaxial with the shaft 7, in which a bearing 80 for supporting the shaft 7 is arranged. The inner ring of the ball bearing 80 co-operates with a sleeve 81, which surrounds the shaft 7 and which is provided with internal key ways which co-operate with the key ways 55 of the shaft 7. The inner wall of the air channels 78 also engages a partition 82 mounted in the housing portion 1 at right angles to the shaft 7; viewed from the side of the blade wheel 75 this partition is located directly in front of the ends of the cylinder linings 16 and 18 and the two further adjacent linings facing said blade wheel. (FIG. 2). The partition 82 has an opening which is coaxial with the shaft 7 and which is provided with a toothed rim 83, which co-operates with the toothing 49 of the thrust ring 42. The toothed rim 83 is parallel to a plane at right angles to the center line 8. The diameter of the toothed rim 83 is larger than the diameter of the circle going through the centers of the sphere 32 and of the three other corresponding spheres associated with the adjacent pistons, whereas the distance of the toothed rim 83 from the shaft 7 is approximately twice the distance between the ends of the piston rods 24 to 27 near the shaft 7 and that shaft. Near the swash plate 39 another toothed rim 84 is arranged in a similar manner, which co-operates with a toothing 85 on the thrust ring 41. The construction of the swash plate 39 and of the swash plate 40, as well as that of the associated toothed rims 83 and 84 are symmetrical to the plane 14.

The air channels 78 continue in the direction of flow of supplied air inside the housing portion 2 and turned inwardly, viewed in the sectional view of FIG. 2. This turn forms part of helical air channel 86, the direction of length of which is invariably about tangential to the circumference of the cylinder linings 16 and 18 and the two further adjacent linings. This helical channel 86 surrounds substantially the whole circumference of part of a cylinder lining, in the wall of which, along the whole circumference a plurality of slots 87 are provided, which communicate with the air channel 86. The center line of each of these slots 87 is substantially tangential. Viewed in the direction of the center line of the lining 16 and away from the boundary surface of said lining facing the plane 14 the slots extend in the range of about 30 to 50% of the length of the lining 16.

The adjacent lining 15 has in the same manner and at the same plane similar slots 87, which also communicate with a helical air channel 86, which surrounds the lining 15 and changes into an air channel 88, which is directed axially, viewed in the sectional view of FIG. 2, but as is shown in FIG. 1 it is also helically arranged with respect to the further part of the housing portion 2. The air channel 88 and the three further air channels associated with the three further cylinders located on the same side of the plane 14 open out in a ring channel 89, which is parallel to a plane at right angles to the center line 8, said channel having an outlet bushing 90 for conducting away the exhaust gases. The ring channel 89 surrounds the swash plate 39.

The housing portion 3 has at its end remote from the plane 14 an end partition 91 having a recess which is coaxial with the shaft 7 and which holds a ball bearing 92, the inner ring of which co-operates with a sleeve 93 having internal key ways fitting to key ways 94 on the outer side of the shaft 7.

Between the air channels 86 located on either side of the plane 14 the cast cylinder block of the housing portion 2 has a plurality of channels 95 for the fluid coolant for the cylinder linings 15 and 18 and the further cylinder linings. These cooling channels 95 extend around each of the cylinder linings and are arranged so that apart from the part with the slots 87 these linings can be cooled over substantially their whole length, particularly the parts located near the plane 14, where owing to the inclined position of the linings the channels have a larger diameter so that the heat dissipation may be higher in the region of the highest temperatures. Near the shaft 7 the walls of the cylinder block engaging said shaft, where the cooling channels 95 and the air channels 86 open out, constitute a sliding bearing for the shaft 7 at the center located between the bearings 80 and 92. The length of this sliding bearing is at least about three times the local dimater of the shaft.

On the side of the housing portion 3 remote from the plane 14 a lid 96 forming mainly the pump housing 4 is secured by means of bolts 97 to the end partition 91 (FIG. 2). The pump housing 4 comprises an oil pump 98.

The shaft 7 is locally surrounded by a sleeve 99 turning with the shaft and having internal key ways which co-operate with the key ways 94. The housing of the oil pump 98 is mainly constructed from three contiguous, recessed plate-shaped pump housing portions 100, 111 and 102. These pump housing portions are arranged around the sleeve 99 and extend away from the sleeve 99 mainly downwards into the lower part of the pump housing 96, which constitutes, in addition, a lubricant reservoir. From FIGS. 2, 7 and 8 it will be seen that the portion 100 has, apart from a recess for the sleeve 99, two merging recesses for holding two gear wheel shafts 103. The center lines of the gear wheel shafts 103 are parallel to the center line 8. Over a length equal to the thickness of the portion 101 the gear wheel shafts 103 are provided with external key ways by means of which oil pump wheels 104 are secured to said shafts, the outer boundaries of said wheels intimately engaging in known manner the merging recesses 105 in the portion 101. The portion 102 also has recesses for holding the two gear wheel shafts 103.

The recesses 105 in the portion 101 communicate through a bore 106 serving as a suction channel with the lower part of the lubricant reservoir and through a bore 107 extending towards the shaft 7 and opening out in a ring channel 108 formed in the portion 101. The sleeve 99 has two diametrically opposite, radial bores 109, which constantly communicate during the rotation of the sleeve 99 with the ring channel 108. The bores 109 in the sleeve 99 correspond with two radial bores 110 in the shaft 7, both opening out in the central bore 56 of the shaft 7.

The sleeve 99 is integral with a gear wheel 111, which drives a gear wheel 112 fastened to one of the two shafts 103. Since one of the oil pump gear wheels 104 is secured to said shaft 103 and the other oil pump gear wheel is driven by the former, the gear wheel pump 98 can be driven by the gear wheels 111 and 112. The sleeve 99 is fixed in an axial direction by the bearing 92 and a nut 113 fastened to the shaft 7. The three portions 100 to 102 are fastened by bolts 114 (FIGS. 7 and 8) to the end partition 91.

The engine according to the invention operates as follows. The position shown in FIGS. 2 and 3 relates to an instant at which the pistons 19 and 20 are at the lower dead point, where these pistons are at a maximum distance from one another, whereas at the same instant the pistons 21 and 22 are at the upper dead point and at the minimum distance from one another. The two further pairs of pistons not shown in these Figures occupy at said instant both identical positions, in which the pistons are midway their strokes.

Each cylinder lining has a diameter of preferably about 8 cms and the stroke is about 5 cms. Since the engine comprises eight pistons, the cylinder capacity is equal to about 2000 cm$^3$.

Referring to the position shown in FIG. 2, air is sucked in through the filter 6 and compressed by means of the blade wheel 75 and pushed away in a radial direction via the stationary blades 77, which suppress the tangential velocity component in this air stream, the air being pushed into the helical air channels 78, which open out in the helical channels 86, the section of which gradually decreases progressively around the associated cylinder lining so that through each of the slots 87 then released by the piston 20 the air can flow in a whirl in a tangential direction into the cylinder space while being affected by the shape of the piston head 23, which strongly contributes to the formation of circulating whirls of the air. The air introduced under pressure moves whirling towards the associated piston 19, the air moving around the corner between the two cylinder spaces. The air leaves the cylinder space associated with the piston 19 through the associated slots 87, the helical channel 86, the helical channel 88 on the housing portion 2, the annular or ring channel 89 and the outlet 90. Owing to the shape of the "bent" combustion space 10, the tangential in- and outflow of air and the shape of the piston head 23 the air introduced under pressure can effectively expell the combustion gases left behind during the preceding operational stroke and fill the space 10 between the two pistons under pressure with fresh combustion air with a comparatively high degree of efficiency.

Approximately at the instant of the nearest approach of the pistons, fuel is injected into the combustion space 11 through the injector 74, said fuel igniting as a result of the compression ratio used so that the flame front spreads in three directions in the three above-mentioned slots formed between the piston heads 23. The pressure exerted on the two pistons 21 and 22 resulting from the combustion is transferred through the piston rods 26 and 27 and the spherical hinges 37 and 38 to the thrust rings 41 and 42 of the swash plates 39 and 40 respectively.

It should be noted that the prolongations of the piston rods 26 and 27 in the medium position intersect the center line 8 during the next-following operational stroke near the place of the bearings 92 and 80, so that the bending moment occurring in the shaft 7 is comparatively very small. The prolongations of the center lines of the piston rods 26 and 27 are at the instant of the maximum value of the combustion pressure approximately parallel to the disc 50 of the swash plate drive 39 and 40 respectively so that at least the heaviest loads on the two discs 50 can be absorbed in a very advantageous manner. This favorable load of the swash plates 39 and 40 results essentially from the fact that the center lines of the two parts of the combustion space 11, that is to say, the center lines of the linings 17 and 18 are at an angle to one another, the part of each of the two linings 17 and 18 located nearest the shaft 7 being located in the proximity of the associated swash plates 39 and 40 respectively. A very low load on the shaft is obtained not only because the parts of the combustion spaces are orientated towards the bearings 92 and 80 respectively but also because the shaft 7 is supported at three points, while the central support from the cast-iron cylinder block of the housing portion 2 covers a comparatively great length of the shaft so that the length of the shaft not being supported is comparatively small. The bearings 92 and 80 may be of simple structure, since they need practically not absorb axial forces, since the internal force system is symmetrical to the plane 14 and the shaft 7 alone can absorb the combustion pressures transferred by the piston rods in the form of axial forces in a state of equilibrium.

After the initiation of the ignition in the combustion space 11, the pistons 21 and 22 thus moving away from one another, the combustion pressure is transferred through the piston rods 26 and 27 to the solid thrust rings 41 and 42 of the swash plate drives 39 and 40. The spheres 37 and 38, as soon as they emerge from the plane of the drawing of FIGS. 2 and 3, exert forces having components which form a couple with respect to the center line 8, acting upon the plates 50 and forming at least part of the engine output couple. In the meantime the pistons moving in the combustion space 12 or 13 have attained the upper dead point and are subjected to the combustion pressure, which is exerted via the associated piston rods on an area of the thrust rings 41 and 42 spaced apart by a circumferential angle of 90° from those of the spheres 37 and 38.

The pistons 19 and 20 (FIG. 2) have meanwhile approached one another and have thus closed the inlet and outlet slots 87, after which compressions occur in the combustion space 10. The process is cyclically repeated.

As a result of, for example, the force exerted by the piston rod 27 (FIG. 3) on the thrust ring 42, the latter could move freely with respect to the associated disc or plate 50, if no further precautions were taken, so that the piston rod 27 would get at such an angle to the center line of the lining 18 that the piston rod would strike the outer boundary of the lining 18, which would, moveover, result in unwanted positioning for an effective transfer of the combustion pressure on the plate 50. In order to avoid this, the toothing 49 of the thrust or pressing ring 42 is constantly in engagement with the toothed rim 83, which is stationary with respect to the engine housing. Therefore, the toothed rim 49 cannot freely turn in an undesirable manner with respect to the plate 50, but the rotating plate 50 tilts the thrust ring 42 via the toothing 49 along the toothed rim 83, it being thus ensured that the piston rod 27 occupies an advantageous position relative to the plate 50 for exerting each time an optimum torque on the plate 50 and the shaft 7 rigidly connected herewith. Owing to the fairly large diameter of the toothed rim 83 (which is greater than that of the circle going through the centers of the spheres 36, 38) the toothings 49 and 83 may be of a very light structure. Since the boundary faces 47, 48 and 51, 52 between the thrust ring 42 and the plate 50 are at an obtuse angle to one another, which is bisected by the center line of the piston rod 27 at the instant of the maximum combustion pressure, a stress and pressure distribution of comparatively low value is obtained in the thrust ring 42, in the plate 50 and in the intermediate sliding faces. Therefore, the thrust ring and the plate can support one another solely via the sliding faces 47, 48, 51, 52 without the need for using sensitive ball bearings or roller bearings to compensate for strong load variations.

As stated above, the piston rods owing to their inclined positions to the shaft 7, engage the swash plate drive near the driving shaft so that the advantage is obtained that the bending forces in the shaft are small and a comparatively very high compression may be used in the combustion spaces. There is a further advantage in that the boundary faces 47, 48 and 51, 52 between the thrust ring 42 and the plate 50 are comparatively small. The disposition of the cylinders inclined towards the driving gears results basically in a driving gear structure of comparatively small size. With an equal stroke of the pistons, the small driving gear is relatively more "inclined" than a driving gear of larger size. Therefore, the component of the force of the combustion pressure transferred by the piston rod, said component forming part of the driving torque, is comparatively large. It is furthermore important that the small swash plate drive has less inertia so that very high speeds can be attained, while the resultant engine can be manufactured at lower cost and occupies little space. Incorporation of such an engine is thus readily possible.

The oil pump 98 is rotated by means of the gear wheel 111 seated on the rotating shaft 7 and the gear wheel 112 being in mesh with the former through the gear wheel shaft 103 so that the pump gear wheels 104 draw in the fluid through the bore 106 and convey it through the bore 107 in upward direction under pressure into the ring channel 108. During the rotation of shaft 7 the bores 109 in the sleeve 99 are constantly in communication with the pressurized fluid in the ring channel 108 so that the lubricant is conducted through the bores 110 into the central bore 56 on the shaft 7 (FIGS. 7 and 8). Through the bores 57 and 59 (FIG. 3) and the bores 58 and 60 the lubricant is introduced into the uninterrupted groove 61 in the thrust ring 42, from where it is distributed among the grooves 62 and 63 evenly provided in the circumference of the boundary faces 47 and 48. Out of these grooves the fluid can be urged in between the boundary faces 47, 51 and 48, 52 respectively. The lubricant is, moreover, conducted from the uninterrupted groove 61 through the bores 64 in the depressions 65 to the peripheries of the spheres 36 and 38, while through said depressions, the bores 66 in the spheres, the bores 67 in the piston rods 25 and 27 and the bores 68 in the spheres located near the pistons, the lubricant can be conducted to the interfaces between the spheres and the bearing cushions 30.

The lubricant can also be nebulized from the channel 56 in the shaft 7 through the bores 69 and 71 and through the calibrated opening 73 in the inserts 72 into the interior of the cylinders of cylinder linings, the associated pistons distributing the lubricant along the inner peripheries of the cylinder linings. The lubricant can be pressed through the bore 70 between the shaft 7 and the inner boundary of the sliding bearing formed by the housing portion 2.

Since the ends of the linings 15 to 18 facing the plane of symmetry 14 are spaced apart from the shaft 7, sufficient space is left for accommodating the channels 95 for the coolant. Thus these channels can be provided exactly at those areas where the cylinder linings have the highest temperatures.

As stated above, with a piston diameter of about 8 cms and a piston stroke of about 5 cms the engine has a cylinder capacity of about 2000 cms$^3$, since eight pistons are provided in four combustion spaces. Also owing to the cmparatively slight load of the swash plate drives and of the shaft 7 the engine is suitable for attaining a fairly high rpm. With a rotational speed of 10,000 rpm the average piston speed is not more than about 16 ms/sec. Owing to this piston speed and to the slight inertia forces in the swash plate drive, the engine has a comparatively high power.

The invention is important for Diesel engines, gas engines, and the like and also for driving hydraulic pumps, in which case pump parts may be directly driven by the swash plates.

The invention is not restricted to the specific statements made herein, but also relates to the details of the Figures described or not described.

Having thus described my invention what I claim as new and desire to setcure by Letters Patent of the United States is:

1. An engine comprising a housing and an elongated straight drive shaft which extends substantially through said housing and is supported in said housing, a plurality of pistons with corresponding rods and cylinders positioned around said drive shaft and mounted to reciprocate in the same general direction as that shaft but non parallel thereto, outer ends of said rods being connected to a swash plate drive on said drive shaft, the prolongation of the longitudinal center line of each said piston rod viewed in a direction at right angles to said drive shaft in its medium stroke position intersecting the longitudinal center line of said drive shaft adjacent said swash plate drive, one end of the walls of each of said cylinders opening into a combustion space and said one end being located a substantial distance from the drive shaft, the opposite end of said walls being positioned adjacent said drive shaft, whereby the distance of said one end of the cylinder walls from the shaft is more than three times the distance between the opposite end and that shaft.

2. An engine comprising a housing and an elongated drive shaft supported in said housing which extends substantially straight throughout said housing, a plurality of pistons with corresponding rods and cylinders positioned around said drive shaft and mounted to reciprocate in the same general direction as that shaft but non parallel thereto, outer ends of said rods being connected to a respective swash plate drive mounted on said shaft and said outer ends having pivot connections with said drive adjacent the drive shaft, the extended longitudinal center lines of each said rod viewed at right angles to said drive shaft intersecting in its respective medium stroke position the longitudinal center line of said drive shaft adjacent its respective said swash plate, said pistons being mounted in cooperating pairs and reciprocable in cylinders that open into common combustion spaces located around the drive shaft adjacent the center portion of said housing, the opposite ends of said cylinders on either side of said common combustion spaces being substantially in contact with each other and said drive shaft.

3. An engine comprising an elongated drive shaft extending through an engine block and pairs of opposing pistons with common combustion spaces being positioned in cylinders disposed around said shaft, one set of pistons of each of said pairs being connected to a swash plate drive at one side of the combustion spaces of said engine and an opposing set of pistons being connected to a second swash plate drive at the opposite side of said spaces, the longitudinal center lines of said cylinders on each side of said spaces extending inwardly in opposite directions to intersect the longitudinal center line of said shaft at points adjacent each said swash plate drive, said shaft being straight throughout said engine block and each swash plate drive comprising a thrust ring and disc on said shaft, piston rods being connected to each thrust ring and a circular toothing being provided on said ring adjacent points of connection of said rods to that ring and around said shaft, said toothing having a diameter larger than a circle passing through said points of connection.

4. An engine as claimed in claim 3, wherein the distance of the toothing from said shaft is about twice the distance between the points of connection and said shaft.

5. An engine as claimed in claim 3, wherein said thrust ring has hemispherical recesses that receive spherical hinges fastened to outer ends of said rods.

6. An engine as claimed in claim 3, wherein a section of said thrust ring has the general shape of a parallelogram.

7. An engine comprising a housing and an elongated drive shaft supported in said housing extending straight substantially entirely through said housing, a plurality of pistons with corresponding rods and cylinders positioned around said drive shaft and mounted to reciprocate in the same general direction as said drive shaft but non parallel thereto, outer ends of said rods being connected to a respective swash plate drive mounted on said shaft and said outer ends having pivot connections with said respective swash plate drive adjacent said drive shaft, said pistons being mounted in cooperating pairs and reciprocal in cylinders opening into common combustion spaces located around said drive shaft adjacent the center portion of said housing, the longitudinal center lines of each of said pistons connected to their respective swash plate drive converging towards the respective said swash plate drive, the extensions of each said rod's longitudinal center line as seen at right angles to said drive shaft intersecting in the mid-stroke position of its corresponding piston the longitudinal center line of said drive shaft adjacent its corresponding swash plate drive, locations where forces transferred by said pistons are exerted on each said swash plate drive being located on a circle, the diameter of said circle being about one-half the diameter of a circle passing through the points of intersection of the center lines of said pairs of cooperating pistons, each said swash plate drive comprising a disc secured on said drive shaft and a thrust ring which rotates relative to said disc being connected to the respective piston rods, the planes of contact between said disc and said thrust ring, viewed in an axial section, being at an angle of at least 90° up to about 120° to one another.

8. An engine as claimed in claim 7, wherein the contact planes form a conical plane and an adjacent cylindrical plane, the coinciding center lines of which are at an angle of about 30° to the center line of said drive shaft.

9. An engine as claimed in claim 7, wherein the center line of each said swash plate drive is at an angle of about 30° to the center line of said shaft.

10. An engine as claimed in claim 7, wherein each swash plate drive comprises a circular toothing on said ring which revolves along a toothed rim secured to said engine.

11. An engine as claimed in claim 10, wherein the diameter of said toothing is substantially larger than the diameter of a circle passing through the connections of said piston rods to said ring.

12. An engine comprising a housing and an elongated drive shaft supported in said housing, a plurality of pistons with corresponding rods and cylinders positioned around said drive shaft and mounted to reciprocate in the same general direction as that shaft but non parallel thereto, outer ends of said rods being connected to a respective swash plate drive mounted on said shaft and said outer ends having pivot connections with said drive adjacent the drive shaft, said pistons being mounted in cooperating pairs and reciprocal in cylinders that open into combustion spaces located around the drive shaft adjacent the center portion of said housing, the opposite ends of said cylinders on either side of said common combustion spaces being substantially in contact with each other and said drive shaft, said swash plate drive comprising a swash plate disc and gear, the center lines of each of said pistons converging towards said swash plate disc and gear of the respective swash plate drive to which they are connected, places where forces transferred by said pistons are exerted on said respective swash plate being located in a circle, the diameter of said circle being about one-half the diameter of a circle passing through the points of intersection of the center lines of pairs of cooperating pistons, said gear comprising a disc means secured on said drive shaft and a thrust ring which rotates with respect to said disc means connected to respective piston rods, the planes of contact between said disc means and said thrust ring, viewed in an axial section, being at an angle of at least 90° up to about 120° to one another, the contact surface between said disc means and said thrust ring having approximately the same length viewed in an axial section, the center line of each respective piston rod, viewed in an axial section, bisecting at an angle between parts of said contact surface in the medium stroke position of said piston rod.

13. An engine comprising a housing and elongated drive shaft rotatably mounted in said housing, combustion and compression spaces being around the approximate center of said housing and pairs of opposing cylinders with pistons opening into said spaces, said pistons having rods connected to swash plate means mounted on said shaft at opposite sides of said spaces, said cylinders and rods extending in the same general direction as that shaft, each said pair of pistons being reciprocable at angles to one another during their strokes to operate said swash plate means and rotate said drive shaft, said pistons having heads that project out of their cylinders during operation, said heads each being conical and located asymmetrically with respect to the center line of the corresponding piston with the tip of each said piston head being located on the side of the center line of that piston remote from said drive shaft, said piston heads being reciprocated towards and away from one another and said combustion spaces during each stroke.

14. An engine as claimed in claim 13, wherein each opposing pair of two pistons in their innermost positions adjacent a common combustion space, enclose a space with the combustion space walls which space, in a radial section view, has three contiguous gaps at an obtuse angle to one another.

15. An engine comprising an elongaged substantially straight drive shaft extending throughout an engine block and pairs of opposing pistons in cylinders with common combustion spaces being positioned around said shaft, one set of pistons of each of said pairs being connected to a swash plate drive at one side of the combustion spaces of the engine and an opposing set of pistons being connected to a second swash plate drive at the opposite side of said spaces, said cylinders of said one set of pistons being at angles to said cylinders of said second set of pistons, said swash plate drives being mounted on said drive shaft in said engine block, each said swash plate drive comprising a disc fastened to said shaft and a thrust ring which is mounted to turn with respect to said disc, one end of said disc having an outer diameter substantially coinciding with the diameter of said shaft, the sliding surfaces between said disc and said thrust ring, in an axial sectional area, being at an angle of about 90° to 120° relative to one another, the rods of said pistons each having a center line, viewed an axial sectional area through the center line of said shaft, that approximately bisects the angle between said disc and ring in the medium of said piston rod.

* * * * *